April 28, 1953 F. M. M. B. SALOMON 2,636,395
TORQUE CONVERTER

Filed Dec. 29, 1949 3 Sheets-Sheet 1

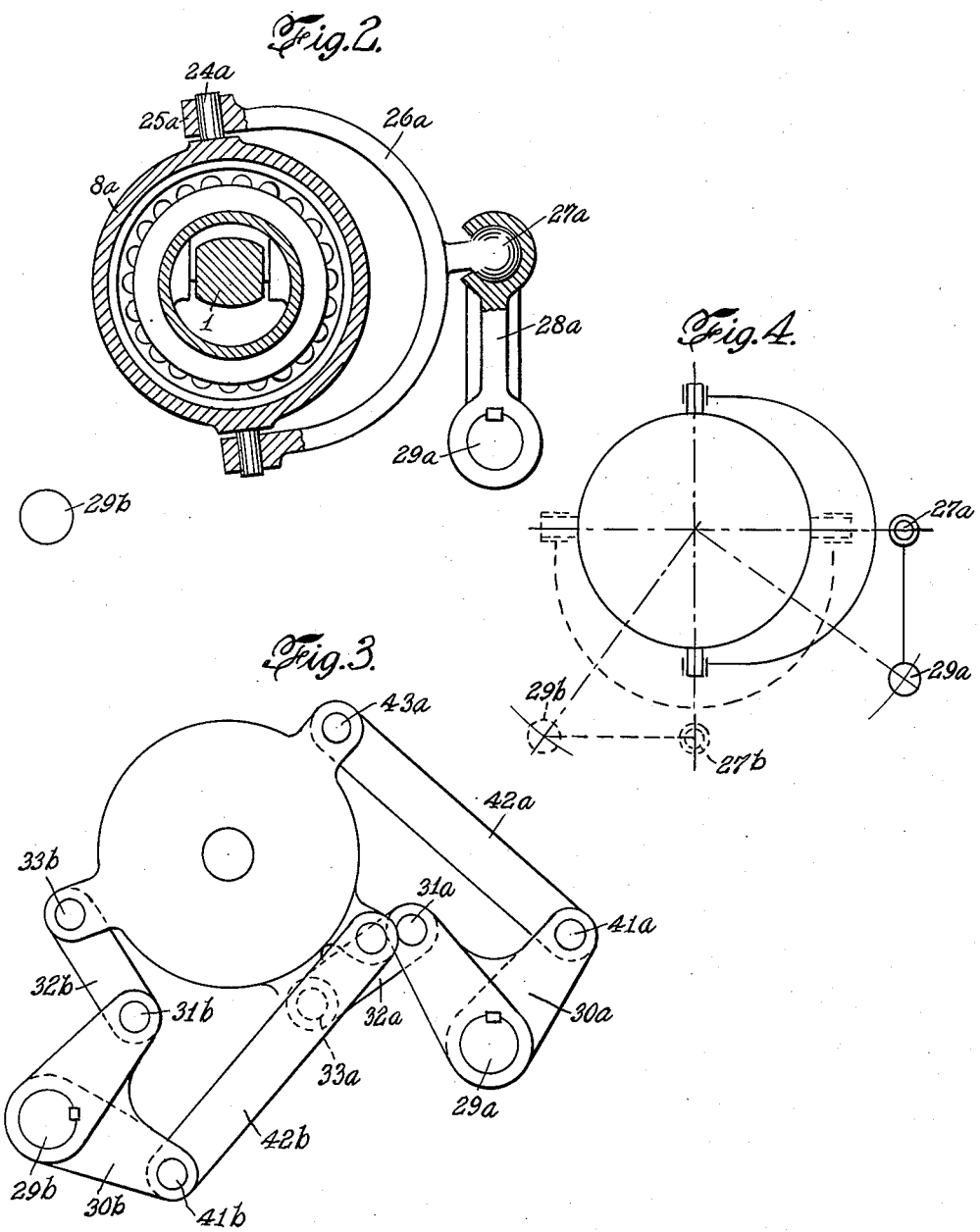

April 28, 1953 F. M. M. B. SALOMON 2,636,395
TORQUE CONVERTER
Filed Dec. 29, 1949 3 Sheets-Sheet 3
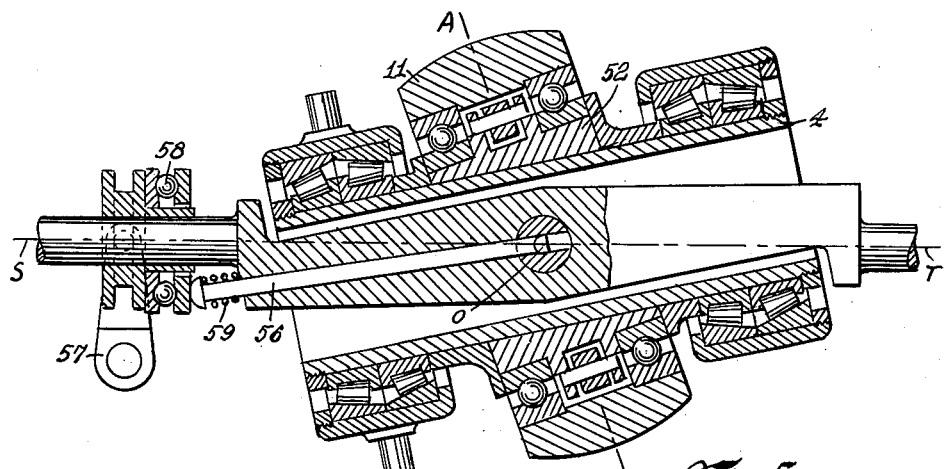
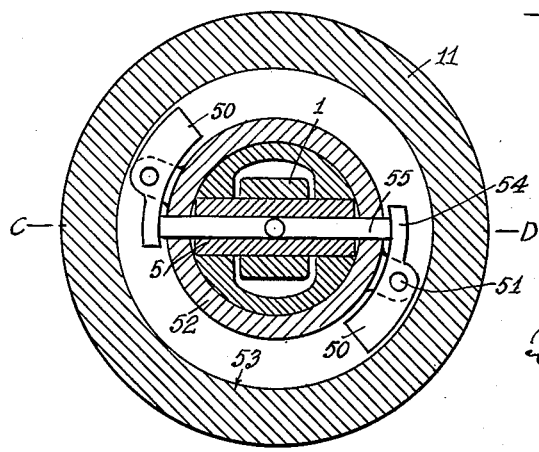
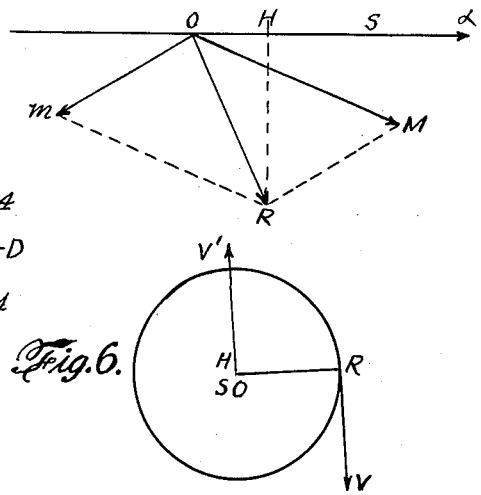
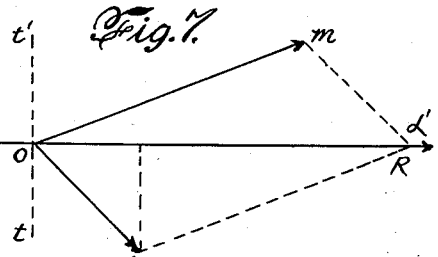
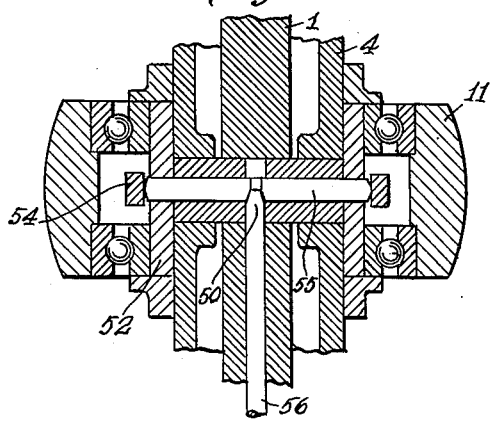

Patented Apr. 28, 1953

2,636,395

UNITED STATES PATENT OFFICE 2,636,395

TORQUE CONVERTER

François Marie Michel Bernard Salomon,
Paris, France

Application December 29, 1949, Serial No. 135,578
In France December 24, 1948

7 Claims. (Cl. 74—116)

The present invention relates to a torque converter.

This apparatus is particularly applicable as a progressive and possibly automatic transmission device.

Some practical embodiments of the invention may be used in particular as change-speed gears and clutch mechanisms in and for road and railway vehicles, but the invention may be extensively and advantageously used in many different fields such as aviation, navy, fixed machines, etc.

In some devices according to the invention a primary or input shaft 1 (having an axis S) drives with rotary motion at least one mechanical unit (E) comprising members subjected to the inertia forces developed by the rotation and, in addition, one member at least of the mechanical unit (E)—which will be referred to hereinafter as "rotor"—is subjected to an auxiliary rotational velocity W' which, in a specific case, may be zero.

The mechanical unit (E)—including the rotor—due notably to the rotation caused by the drive from the primary shaft S will engender at least one resultant vector $m$ which is a moment of momentum and will be referred to hereinafter as "kinetic moment vector $\overline{m}$" or, for short, "$\overline{m}$ vector."

By virtue of the theorem of the moment of quantities of movement or momentum (also called "theorem of kinetic moments") the variations of the vector $m$ in time and/or space engender alternating couples which will be referred to hereinafter as "alternating torques T."

These alternating torques T produce reciprocating motion about at least one axis A and this reciprocating motion is transmitted—for instance through connecting-rods—to at least one reciprocating motion rectifier mounted on at least one output shaft 2.

The above-named rectifier may consist of a free-wheel, a ratchet-wheel or any similar device.

By varying at least one auxiliary angular velocity W' of at least one "rotor" it will be possible to modify the "kinetic moment vector $\overline{m}$" and, therefore, the torque T from which the reciprocating motion is derived.

As will be made clear presently the arrangement broadly described hereinabove makes it possible to vary the ratios of angular velocities between input and output shafts (1 and 2).

In fact, the amplitude of the reciprocating motion of the members which drive the member or members provided for rectifying the motion is subordinated dynamically to the aforesaid "kinetic momentum vector $\overline{m}$" and to its variations both in time and space.

Thus, by modifying the vector $\overline{m}$ it is possible to modify the amplitude; now, as the angular velocity of the output shaft 2 is proportional to this amplitude it also depends on the vector $\overline{m}$ and, in short, it depends notably on the auxiliary angular velocity W' of the corresponding "rotor."

As a specific case and for a given value of this auxiliary angular velocity W' it will be possible to declutch the transmission.

The variations in auxiliary angular velocity W' may be controlled by the operator of the apparatus or by an automatic control device or both. A great variety of automatic working systems may be used.

Other features and advantages of the invention will appear from the specification in connection with the drawings affixed to it, which illustrate by way of example a preferred embodiment of the invention.

In the drawings:

Fig. 2 is a fragmentary sectional view along the line AB of Fig. 1;

Fig. 3 is a fragmentary view according to the line CD of Fig. 1;

Fig. 4 is a diagram in connection with Fig. 2;

Figs. 5, 6 and 7 are explanatory diagrams;

Fig. 8 is a modified embodiment of the "rotor" portion of the apparatus;

Fig. 9 is a sectional view along the line AB of Fig. 8, and

Fig. 10 is a section along the line CD of Fig. 9.

Figure 1:
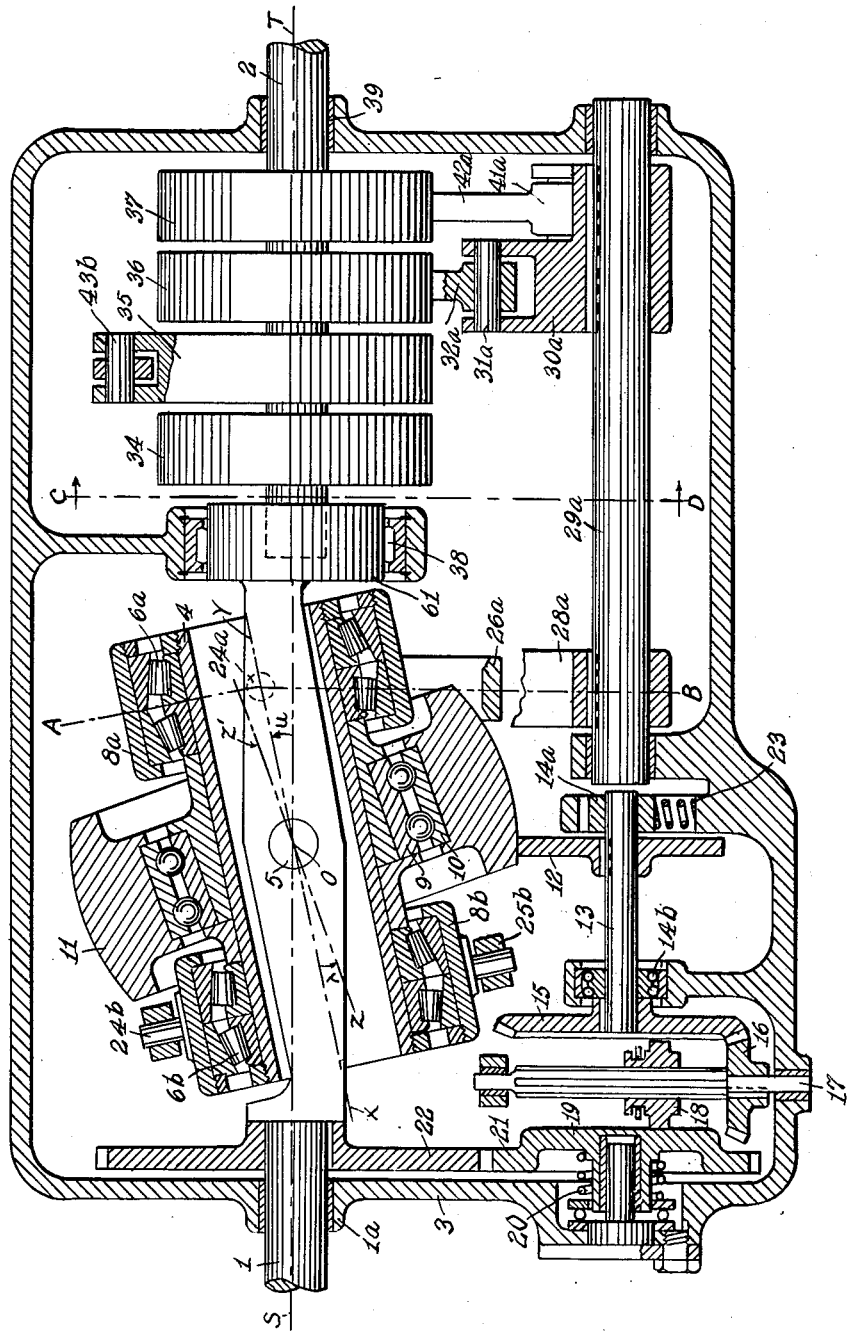
Fig. 1 is a longitudinal section of the torque converter.

Referring now to the drawing and more particularly to Fig. 1, in the embodiment given by way of example the torque converter is shown having a primary input shaft 1 mounted for rotation about an axis S and a secondary or output shaft 2 mounted for rotation about an axis T in axial alignment with the axis S, but it will be understood that this shaft arrangement is only given by way of example and may be different. The input shaft 1 is journaled for rotation in a bearing 1a provided in the casing 3 and drives a cylindrical hub 4 having an axis XY.

The angular relationship between the hub 4 and the axis S may be varied. For this purpose, the hub carries a pin 5 having an axis O and mounted for rotation with the hub about the axis S. The axis O is at right angles with the axis S and describes a plane at right angles with the axis S at O.

The hub 4 is provided with tapered roller bearing 6a and 6b (Fig. 1) but any other type of bearing may be used for this purpose, for instance ball-, needle-bearings, etc. Bushings may also be used in place of bearings.

The outer rings $8a$, $8b$ of the bearings are operatively connected, as will be made clear presently, with members adapted to transmit reciprocating motion to the rectifying members mounted on the output shaft 2.

The inner ring 9 of a bearing 9, 10 (here a ball-bearing, but a plain, roller or needle-bearing may be used as well) is fitted on for integral rotation with the hub 4. The bearing 9, 10 has a geometrical axis X—Z' which forms a constant angle $\lambda$ with the axis XY of the hub 4. In a specific case, the angle $\lambda$ may be zero or substantially zero.

The outer ring 10 acts as a centering member for a solid body of revolution 11.

The outer surface of the body 11 is a portion of a sphere.

This body 11 is a "rotor" in the sense defined hereinabove.

Various means may be used for imparting a real velocity of rotation W' (i. e. a velocity of rotation in relation to the hub 4 and inner ring 9) to the solid body of revolution 11.

One of these means is illustrated in Fig. 1 by way of example.

The means employed in this case consists of a disc 12 having its outer periphery constantly urged against the spherical surface of the body 11; the disc 12 is keyed on a shaft 13 journaled in a pair of bearings $14a$ and $14b$. As will be apparent from the drawing, the bearing $14a$ is urged upward by a spring 23 and the bearing $14b$ is of a self-aligning type.

The shaft 13 has keyed thereon a bevel gear 15 meshing with a pinion 16 fast with a shaft 17 positioned at right angles to the shaft 13. The shaft 17 has a splined portion cooperating with a sliding roller 18 frictionally engaged with a friction plate 19. A spring 20 provided around the hub of the friction plate 19 urges the latter against the roller 18 (Fig. 1). The outer periphery 21 of the plate 19 forms a spur gear meshing with another spur gear 22 keyed on the input or primary shaft 1.

The roller 18 may be moved along the shaft 17 by means not shown in the drawings, in order to progressively vary the ratio of angular velocities of the input shaft S and shaft 13.

Thus, the real angular velocity W' impressed to the rotating body 11 (Fig. 1) will have any desired value within wide limits and this velocity may be obtained in a gradual manner since a frictional drive is established between the roller 12 and the body of revolution 11 against which the roller is urged by the spring 23 as explained above. It will be obvious that this spring action is permitted by the self-aligning bearing $14b$.

Now, the manner in which reciprocating motion is developed by the members carried (Fig. 1) by the input shaft 1, and how this reciprocating motion is transmitted to the rectifying members mounted on the output shaft 2 will be explained hereinafter.

The outer ring $8a$ of the bearing $6a$ carries two diametrally opposed pins $24a$ having their common axis perpendicular to the axis XY of the hub 4 (Figs. 1 and 2).

Both pins $24a$ are journaled for rotation in bearings $25a$ formed at each end of a stirrup-piece $26a$ (Fig. 2). The stirrup-piece $26a$ is pivoted through a ball-and-socket joint $27a$ on a crank-arm $28a$ keyed on a shaft $29a$ disposed in parallel relationship with the input shaft 1 (Figs. 1, 2 and 3). Also keyed on the shaft $29a$ is a member $30a$ having pivotally mounted thereon, through pins $31a$, $41a$, a pair of connecting-rods $32a$ and $42a$ (Figs. 1 and 3).

Each of the connecting-rods $32a$, $42a$ engages a member adapted to rectify reciprocating motion and is pivoted, for this purpose, on that portion of the rectifier to which the reciprocating motion is impressed.

The connecting-rod $32a$ engages the member 36 through a connecting pivot $33a$ and the connecting-rod $42a$ engages the member 37 through a connecting pivot $43a$ (Figs. 1 and 3).

In the embodiment of Fig. 1 the output shaft 2 having an axis T is driven by four rectifying members, it being understood that the aforesaid axis T is in alignment with the axis S of the primary or input shaft 1.

Suitable bearings 38, 39 are provided for supporting the shaft 2.

The outer ring $8b$ of bearing $6b$ is connected to and drives another shaft $29b$ parallel with the input shaft 1 through means similar to those described above with reference to the transmission from the outer ring $8a$ to shaft $29a$, these means comprising a stirrup-piece $26b$ similar to the stirrup-piece $26a$ described above and shown in Fig. 2.

Figs. 2, 3 and 4 show that the shaft $29a$ is offset by $$\frac{\pi}{2}$$

with respect to the shaft $29b$ about the axis S of shaft 1. A time lag of $$\frac{\pi}{2}$$

will therefore result between the reciprocating movements of shaft $29a$ with respect to those of shaft $29b$.

These movements are transmitted through means similar to those illustrated in Fig. 3 to reciprocating motion rectifying members 34, 35 which are the same as members 36, 37 and mounted on the same output shaft 2.

These rectifying members may consist of free-wheels or ratchet wheels of any known type.

The above-described apparatus operates as follows:

By impressing a rotary motion on the primary or input shaft 1 with an angular velocity $$a'=\frac{d\theta}{dt}$$

the hub 4 and possibly the masses integral therewith will engender a kinetic moment vector $\overline{M}$ which rotates with an angular velocity $a^{1\prime}$ about the axis S (Fig. 5). In a specific case, this vector could be directed along the axis S.

At the same time the solid of revolution 11 (Fig. 1) is driven in the relative motion with an angular velocity W', as explained above. Thus, a kinetic moment vector $\overline{m}$ (Fig. 5) rotating about the axis S with an angular velocity $a$ will also result.

The rotating vectors $\overline{M}$ and $\overline{m}$ yield a resultant vector $\overline{R}$ which is also rotated with an angular velocity $a^{1\prime}$ about the axis S. The roles played by the various kinetic moment vectors in the operation of the device will appear more clearly if reference is made to Fig. 5.

The terminal point R of the kinetic moment vector resulting from $\overline{OM}$ and $\overline{om}$ describes with a velocity $V = \overline{HR}a'$ a circle with radius $\overline{HR}$, H being the lower end of the perpendicular distance from R to the axis S (Fig. 6).

According to the theorem of the kinetic moments the torque (C) produced by the motion of the system is represented by a vector equipollent with the vector $\overline{OV'}$ which is itself equal and of reverse direction in relation to the vector $\overline{V}$ which is the velocity of the point R.

The vector $\overline{OV'}$ (Fig. 6) corresponding at any moment to this torque (C), rotates about the axis S with an angular velocity $a^{1'}$ and thus engenders multiphase alternating torques having the same frequency as the rotation frequency of the input shaft.

These alternating torques are notably proportional to the angular velocity $a^{1'}$ of the primary or input shaft 1, other things being equal. These alternating torques are therefore very low when $a^{1'}$ has a low value. Thus, when low velocities $a^{1'}$ are imparted to the primary shaft a declutching action will result. This is extremely important especially in the motor vehicle field since it makes it possible to obtain an automatic declutching action.

On the other hand, the alternating torques (C) are functions notably of the vector $\overline{m}$ and, therefore, of the velocity W'.

It is thus possible, by modifying this velocity W'—other things being equal—to modify the vector $\overline{m}$ and consequently the resultant vector $\overline{R}$.

More specifically, it may be arranged that the vector $\overline{m}$ be such that the resultant $\overline{R}$ of both vectors $\overline{m}$ and $\overline{M}$ will be directed along the axis S. This case is illustrated in Fig. 7. The components of $\overline{OM}$ and $\overline{om}$ according to the axis t—t' perpendicular to the axis S are equal and opposite.

Therefore, the transmission will be declutched even if the angular velocity $a^{1'}$ is not zero, because in this case the radius $\overline{HR}$ would be zero, the point R would have no velocity at all and the torque (C) would not be engendered.

Broadly speaking, by modifying the auxiliary velocity W' of the body of revolution 11 the value of the torque (C) will be modified and therefore the values of the impulses acting on the transmission members 34, 35, 36, 37 (which are motion rectifiers such as free-wheels, ratchet, etc.) will also be changed. As a consequence thereof, for given dynamic conditions the ratio $$\frac{\beta'}{\alpha'}$$

of the angular velocity $\beta'$ of the output shaft 2 to the angular velocity $\alpha'$ of the input shaft will be modified, $\beta'$ being the angle indicating the position of the output shaft.

The variations of velocity of W' will be obtained very easily by displacing the roller 18 along its splined shaft 17 either through a manually controlled device or by means of an automatic control member of any desired type.

In certain specific cases it may be advantageous to have the solid of revolution 11 fast with the hub 4, which is like counterbalancing or reducing to zero the relative velocity W'; Figs. 8, 9 and 10 deal more specifically but not exclusively with this hypothesis.

Referring to Figs. 8 and 9 it will be seen that, for this purpose, the hub 4 is fitted with an auxiliary sleeve 52 on which are pivotally mounted, by means of pins 51, a pair of friction shoes 50 adapted to engage the inner surface 53 of an annular portion of the body 11.

The shoes 50 are controlled from the outside in the following manner:

The shoes 50 are provided with extensions 54 engaging the outer ends of a pair of push-rods 55 the inner ends of which are formed with cam faces shown more particularly in Fig. 10. A thrust rod 56 (see Figs. 8 and 10), adapted to slide in a bore provided in the input shaft 1, has a tapered inner end engageable with the aforesaid cam faces of the rods 55 and an outer end having a head which is kept in frictional engagement against a thrust-bearing 58 mounted on the shaft 1 and axially movable therealong by means of a control fork 57.

It will be apparent that when the thrust-bearing 58 is shifted to the right (Fig. 8) the inner tapered end of the rod 56 (Fig. 10) will drive the push-rods 55 against the extensions 54 of the shoes 50 which are therefore kept away from the inner surface 53 of the body 11.

On the contrary, if the thrust-bearing 58 is pushed leftward the shoes may freely engage and brake the body 11 either through centrifugal forces acting on the shoes or by means of spring members (not shown).

Thus, it will be possible to lock or unlock at will the body 11 with the hub 4, i. e. the surface 53 with the auxiliary sleeve 52.

Fig. 1 shows also in a dagrammatic manner a make-and-break contact device operating in the manner described hereafter.

In various applications and notably in motor vehicles it may be advantageous to avoid or limit the so-called "free-wheel" running.

"Free-wheel" running may be briefly defined as follows: Assuming that the output shaft 2 tends to rotate at a higher speed than the input shaft 1, under these conditions it may be desirable that the output shaft tends to drive the input shaft in order to produce, for instance, the reverse drive which is currently defined as "engine braking" in the case of automobiles.

This result will be obtained in a very simple manner by providing a free-wheel or pawl-and-ratchet mechanism 61, as such devices are more broadly defined, so that the output shaft 2 may rotate slower but not faster than the input shaft 1.

Should the velocity $\beta'$ tend to exceed $\alpha'$, the connecting device 61 will become operative and therefore the shaft 1 will be driven by the shaft 2.

Of course, the invention is not restricted to the devices shown and described hereinabove. Thus the body of revolution 11 may be driven through any system other than the friction drive illustrated, notably by using an electric motor or fluid-controlled and fluid-operated devices (liquid- or gas-controlled and/or -operated).

On the other hand, the body 11 may be provided with turbine blades and a jet of compressed air may be directed against the blades; by modifying the pressure and/or velocity of the jet it will be possible to vary the velocity W' of the body 11.

Where a friction drive system is used the friction roller and wheel illustrated may be replaced by devices of the brake class.

Regarding the output shaft drive, when motion rectifiers are utilized the arrangement may comprise any type of motion selectors such as, for instance, various types of free-wheels or discontinuous coupling clutches, etc.

Also in accordance with the invention the effects of inertia which produce the kinetic moments occurring in the transformation of energy may be supplemented by resilient effects, notably in the form of spring actions of any desired types.

It will be understood that the number of intermediate shafts such as 29a, 29b may vary at will and, more especially, this number may exceed two, the same applying also to the number of rectifying members mounted on each output shaft, since the arrangement makes it possible to provide more than one output shaft.

What I claim is:

1. A torque converter comprising at least one driving shaft, at least one mechanical structure positioned to receive the inertia forces developed by the rotation of said shaft and comprising a hub making a variable angle with the axis of the shaft, bearings mounted on the said hub, at least one auxiliary member rotating on the said bearings at a variable rotation velocity, other bearings mounted on the hub, the axis of the last mentioned bearings being the same as the axis of the hub, hinged connections mounted on said other bearings, intermediate shafts, transmission members pivotally mounted on said hinged connections and adapted to transmit reciprocating motions to said intermediate shafts, and connecting rods for transmitting the motions of said intermediate shafts to rectifying members adapted to transform reciprocating motion into rotary motion, at least one driven shaft carrying said rectifying members, the axis of said driven shaft being in axial alignment with the driving shaft, and means for varying the rotation velocity of the auxiliary member.

2. A torque converter comprising at least one driving shaft, at least one mechanical structure positioned to receive the inertia forces developed by the rotation of said driving shaft and comprising a hub, a mechanical axle perpendicular to the geometric axis of said driving shaft and rotatable with said shaft, said hub being pivotably movable around said mechanical axle, bearings mounted on said hub, hinged connections mounted on said bearings, second shafts parallel to the driving shaft and disposed around said driving shaft, connecting rods pivotably mounted on said hinged connections and adapted to transmit multi-phased reciprocating motions to said parallel shafts, at least one other bearing mounted on the pivotably movable hub, at least one auxiliary member rotatable on the said other bearing at a variable rotational velocity, at least one driven shaft, rectifying members mounted on said driven shaft, connecting rods for transmitting the motions of the parallel shafts to said rectifying members, and means for varying the rotational velocity of the auxiliary member.

3. A torque converter comprising at least one driving shaft, at least one mechanical structure positioned to receive the inertia forces developed by the rotation of said driving shaft and comprising a hub, a mechanical axle perpendicular to the geometric axis of said driving shaft and rotatable with said shaft, said hub being pivotably movable around said mechanical axle, the axis of said hub making an angle dynamically variable with the axis of the driving shaft, bearings mounted on said hub, hinged connections mounted on said bearings, second shafts parallel to the driving shaft and disposed around said driving shaft, connecting rods pivotably mounted on said hinged connections and adapted to transmit multi-phased reciprocating motions to said parallel shafts, at least one other bearing mounted on the pivotably movable hub, at least one auxiliary member rotatable on the said other bearing at a variable rotational velocity, at least one driven shaft, rectifying members mounted on said driven shaft, connecting rods for transmitting the motions of the parallel shafts to said rectifying members, and means for varying the rotational velocity of the auxiliary member.

4. A torque converter comprising at least one driving shaft, at least one mechanical structure positioned to receive the inertia forces developed by the rotation of said driving shaft and comprising a hub, a mechanical axle perpendicular to the geometric axis of said driving shaft and rotatable with said shaft, said hub being pivotably movable around said mechanical axle, bearings mounted on said hub, hinged connections mounted on said bearings, second shafts parallel to the driving shaft and disposed around said driving shaft, connecting rods pivotably mounted on said hinged connections and adapted to transmit multiphased reciprocating motions to said parallel shafts, at least one other bearing mounted on the pivotably movable hub, at least one auxiliary member rotatable on the said other bearing at a variable rotational velocity, at least one driven shaft, the axis of said driven shaft being in axial alignment with the axis of the driving shaft, rectifying members mounted on said driven shaft, connecting rods for transmitting the motions of the parallel shafts to said rectifying members, and means for varying the rotational velocity of the auxiliary member.

5. A torque converter comprising at least one driving shaft, at least one mechanical structure positioned to receive the inertia forces developed by the rotation of said driving shaft and comprising a hub, a mechanical axle perpendicular to the geometric axis of said driving shaft and rotatable with said shaft, said hub being pivotably movable around said mechanical axle, bearings mounted on said hub, hinged connections mounted on said bearings, two second shafts parallel to the driving shaft and disposed around said driving shaft, in such manner that the lines from the axes of said two second shafts to the axis of said driving shaft form a right angle, connecting rods pivotably mounted on said hinged connections and adapted to transmit multiphased reciprocating motions to said parallel shafts, at least one other bearing mounted on the pivotably movable hub, at least one auxiliary member rotatable on the said other bearing at a variable rotational velocity, at least one driven shaft, rectifying members mounted on said driven shaft, connecting rods for transmitting the motions of the parallel shafts to said rectifying members, and means for varying the rotational velocity of the auxiliary member.

6. A torque converter comprising at least one driving shaft, at least one mechanical structure positioned to receive the inertia forces developed by the rotation of said driving shaft and comprising a hub, a mechanical axle perpendicular to the geometric axis of said driving shaft and rotatable with said shaft, said hub being pivotably movable around said mechanical axle, bearings mounted on said hub, hinged connections mounted on said bearings, second shafts parallel to the driving shaft and disposed around said driving shaft, connecting rods pivotably mounted on said hinged connections and adapted to transmit multi-phased reciprocating motions to said parallel shafts, at least one other bearing mounted on the pivotably movable hub, at least one auxiliary member rotatable on the said other bearing at a variable rotational velocity, at least one driven shaft, rectifying members mounted on said driven shaft, connecting rods for transmitting the motions of the parallel shafts to said rectifying members, and friction means for varying the rotational velocity of the auxiliary member.

7. A torque converter comprising at least one driving shaft, at least one mechanical structure positioned to receive the inertia forces developed by the rotation of said driving shaft and comprising a hub, a mechanical axle perpendicular to the geometric axis of said driving shaft and rotatable with said shaft, said hub being pivotably movable around said mechanical axle, bearings mounted on said hub, hinged connections mounted on said bearings, second shafts parallel to the driving shaft and disposed around said driving shaft, connecting rods pivotably mounted on said hinged connections and adapted to transmit multi-phased reciprocating motions to said parallel shafts, at least one other bearing mounted on the pivotably movable hub, at least one auxiliary member rotatable on the said other bearing at a variable rotational velocity, at least one driven shaft, rectifying members mounted on said driven shaft, connecting rods for transmitting the motions of the parallel shafts to said rectifying members, and means for automatically varying the rotational velocity of the auxiliary member.

FRANÇOIS MARIE MICHEL
BERNARD SALOMON.

References Cited in the file of this patent

UNITED STATES PATENTS

| Number | Name | Date |
| --- | --- | --- |
| 1,162,593 | Fieux | Nov. 30, 1915 |
| 1,536,820 | De Lavaud | May 5, 1925 |
| 1,537,515 | Weiss | May 12, 1925 |
| 1,553,193 | Siddle | Sept. 8, 1925 |
| 1,596,238 | De Lavaud | Aug. 17, 1926 |
| 1,901,098 | Guinness | Mar. 14, 1933 |
| 2,243,928 | Waterman | June 3, 1941 |

FOREIGN PATENTS

| Number | Country | Date |
| --- | --- | --- |
| 184,447 | Great Britain | Nov. 9, 1922 |